United States Patent [19]

Ray et al.

[11] Patent Number: 4,647,023

[45] Date of Patent: Mar. 3, 1987

[54] HYDRAULIC ANTIVIBRATION SUPPORTS

[75] Inventors: Jean Ray; Daniel Gregoire; Pierre Jouade, all of Chateaudun, France

[73] Assignee: Hutchinson, Paris, France

[21] Appl. No.: 705,749

[22] Filed: Feb. 26, 1985

[30] Foreign Application Priority Data

Feb. 27, 1984 [FR] France ................ 84 02969

[51] Int. Cl.$^4$ ............ F16F 1/36; F16F 15/04
[52] U.S. Cl. .................... 267/8 R; 267/140.1
[58] Field of Search ............ 267/8 R, 35, 64.19, 267/64.23, 64.27, 113, 140.1, 153; 188/378, 379, 380; 180/312; 248/562, 565, 636

[56] References Cited

U.S. PATENT DOCUMENTS 4,159,091 6/1979 Le Salver et al. ............ 267/113 X
4,288,063 9/1981 Brenner et al. ............ 267/140.1 X

FOREIGN PATENT DOCUMENTS 27751 4/1981 European Pat. Off. .

Primary Examiner—Douglas C. Butler
Assistant Examiner—Richard R. Diefendorf
Attorney, Agent, or Firm—G. Kendall Parmelee; George W. Rauchfuss, Jr.

[57] ABSTRACT

The invention relates to an antivibration support comprising, between two rigid elements, a box which defines two deformable chambers filled with liquid separated by a deformable partition and communicating with each other through a throttled passage. The partition is constituted by a diaphragm surrounded by a beading which is gripped between two perforated thin metal disks, the periphery of the first disk alone is overlapping and fixed to one of the rigid elements, and the passage comprises a curvilinear channel bounded by areas of the beading, of the first disk and of an elastic wall of the box.

8 Claims, 3 Drawing Figures

HYDRAULIC ANTIVIBRATION SUPPORTS

BACKGROUND OF THE INVENTION

The invention relates to antivibration devices designed to be inserted for supporting and shockabsorbing purposes between two rigid elements, the shock-absorbing bringing into play the driving of a liquid through a throttled passage, and the relative movements to be damped of the two rigid elements comprising on the one hand oscillations of relatively large amplitude (that is to say greater than a mm) at relatively low frequency (that is to say less than 20 Hz) and on the other hand vibrations of relatively small amplitude (that is to say less than 0.5 mm) and relatively high frequency (that is to say higher than 20 Hz).

By way of a non-limiting example, it is indicated that such supports can be mounted between a vehicle chassis and the motor of this vehicle, the relatively ample oscillations to be damped being those created by the irregularities and variations in declivity of the ground during the running of the vehicle over this ground and the vibrations to be damped being those due to the operation of the engine.

The invention relates more particularly, among supports of the type concerned, to those which are constituted by a fluid-tight box interposed between the two rigid elements, said box comprising two rigid parts which can respectively be made fast with the two rigid elements, a first elastic wall joining one of the rigid parts in fluid-tight manner to a rigid annular armature forming a portion of the second part, this wall defining with the first part one of the two axial ends of the box, a second elastic wall borne in fluid-tight manner by the annular armature and defining the second axial end of the box, a deformable partition also borne in fluid-tight manner by the annular armature, between the two elastic walls, and dividing the inside of the box into two chambers, these two chambers communicating with each other through the above throttled passage, means for limiting to a small amplitude, that is to say less than 1 mm, the deflections of thepartition in the axial direction perpendicular to its middle plane, and a liquid mass filling one of the two chambers and at least the portion, of the other chamber, contiguous with the deformable partition.

With such a support, vibration of high frequency and of low amplitude exerted between the two rigid elements generates corresponding relative movements of the two rigid parts, which are transmitted to the deformable partition through the liquid and are manifested by a rapid succession of alternate deflections of this partition perpendicularly to itself, of amplitude less than the maximum possible value : the dimensions of the partition are in fact sufficient for the liquid then not to be driven through the throttled passage in opposite directions in synchronism with said vibration.

On the other hand, for oscillations of higher amplitude and of lower frequency, the amplitude of the corresponding deflections of the partition reaches its maximum possible value and the liquid is then driven through the throttled passage, which ensures the desired hydraulic damping by throttling this liquid.

Numerous arrangements have been proposed to constitute the deformable partition, the means limiting the deflection of this partition and the throttled passage.

It is an object of the invention to provide for this arrangement a system resulting in a particularly economic, robust and efficient construction.

GENERAL DESCRIPTION OF THE INVENTION

According to this system, the deformable partition is constituted by a thin diaphragm of elastic material surrounded by a continuous annular beading produced from molding with it, this beading is applied on the one hand, directly or not, against the opposite elastic wall and on the other hand against a metal washer whose outer edge extends radially beyond the beading and is fixed to the above rigid annular armature, between the two elastic wall, and the throttled passage is essentially constituted by a curvilinear channel bounded internally by the outer surface of the beading, on one of its axial surfaces, by the washer, and externally and on its other axial surface, by areas of the abovesaid opposite elastic wall.

In preferred embodiments, recourse is had in addition to one and/or other of the following features :

- the washer constitutes the peripheral portion of a perforated thin disk,
- in a support according to the preceding paragraph, the beading is encaged contiguously between the washer and the peripheral portion of a perforated thin metal disk of smaller diameter than the first,
- in a support according to the preceding paragraph, means for limiting the amplitude of the deflections of the diaphragm comprise projections provided on this diaphragm and/or the surfaces, of the disks, facing said diaphragm,
- the above projections are convex bulges, preferably hemispherical, produced by molding with the diaphragm,
- the elastic wall which comes into contact, directly or not, with the beading and which defines in part the throttled passage is the first above elastic wall,
- the fastening of the outer edge of the washer to the rigid annular armature is ensured by clamping this edge between a metal ring applied axially against this armature and a flanged annular ring of a metal plate comprised by said armature.

The invention comprises, apart from these main features, certain other features which are preferably used at the same time and which will be more explicitly considered below.

BRIEF DESCRIPTION OF THE DRAWINGS

In the following, preferred embodiments of the invention will be described with reference to the accompanying drawings given, of course, purely by way of non-limiting examples.

DESCRIPTION OF PREFERRED EMBODIMENTS

Figure 1:
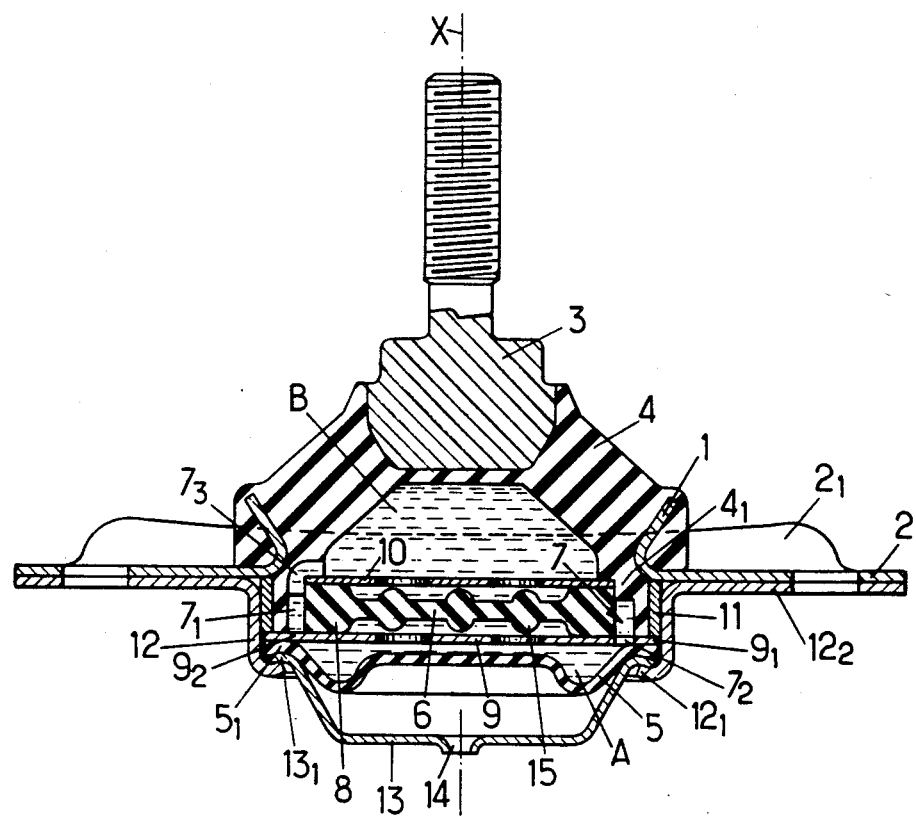
FIG. 1, of this drawing, shows in axial section an embodiment of a hydraulic antivibration support constructed according to the invention.
Figure 2:
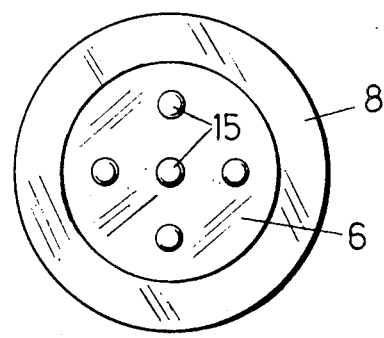
FIG. 2 shows plan view the central deformable partition comprised by this support.

The support concerned is designed to be inserted vertically between a rigid bearing member such as a vehicle frame and a rigid supported member such as an internal combustion engine.

This support is in the general form of a sealed box comprising, in a manner known in itself:
- an annular armature 1 extended horizontally by two perforated lugs 2 which can be fastened, particularly by bolting, with the bearing member and reinforced by flanged rims 21,
- a rigid cap 3, for example in the form of a bolt whose threaded portion extends upwards, which can be made fast to the supported member,
- a thick and fluid-tight frustoconic wall 4 of rubber or similar elastic material adhered respectively to the armature 1 and to the cap 3 and suitable for resisting elastically axial compression,
- and a fluid-tight elastic wall 5 whose periphery is fixed in fluid-tight manner to the annular armature 1.

A deformable partition 6 divides the inside of this box into two chambers A and B, both filled with liquid.

Communication of the liquid between these two chambers is effected exlusively through a throttled passage 7 open constantly.

It is essentially on the constitution of the partition 6 and its environment, here including the passage 7, with which the present invention is concerned.

The partition 6 in question is here constituted by a thin elastic diaphragm of rubber or elastomeric material, surrounded by a continuous annular beading 8 thicker than it and produced by molding with it.

The majority of the elements considered here, and in particular the armature 1, the elastic walls 4 and 5, the diaphragm 6 and its beading 8 have shapes of revolution around the same axis X.

This axis X defines a direction which is called "axial" in the present description and which is vertical in the example illustrated.

In the same way, the two elastic walls 4 and 5 are assumed in the following to be situated respectively above and below, to simplify the description, but without being considered as limiting.

The beading 8 is bounded axially by two parallel flat transverse surfaces and externally by cylindrical surface of revolution of diameter d.

This beading 8 is gripped between two perforated thin metal disks 9 and 10 supported respectively on their two flat surfaces.

The first disk 9 has a diameter D greater than d and its periphery $9_1$ is fixed to the annular armature 1.

This fixation is ensured by clamping said periphery $9_1$ between on the one hand the lower axial extremity of a cylindrical ring 11 whose upper axial extremity is applied axially against the aramture 1 and on the other hand the lower annular edge $12_1$ turned back towards the axis and then upwards in crimped manner, of a metal collar 12 which surrounds said ring 11 contiguously and of which a radial extension $12_2$ is welded to said armature 1.

Between the periphery $9_1$ and the crimped edge $12_1$ are clamped in addition:
- the edge $5_1$ of the elastic wall 5, which is advantageously constituted by a very deformable pleated thin sheet,
- and the edge $13_1$ of a lower protective cover 13 perforated at its center 14.

The diameter of the second disk 10 is equal to that d of the beading 8.

The periphery of the second disk comes into contact with a complementary bearing surface formed in the inner surface of the elastic wall 4.

As for the throttled passage 7, it comprises essentially a channel $7_1$ incurved in a circular arc around the axis X and it extends over an arc generally comprised between 180° and 300° C.

This channel $7_1$ is bounded:
- internally by the outer cylindrical surface of the beading 8,
- below by an annular area $9_2$ of the first disk 9, within its periphery $9_1$,
- externally and above, by two corresponding surfaces formed in the base of the elastic wall 4.

The communications between the two ends of this curvilinear channel $7_1$ and respectively the two chambers A and B are ensured very simply, the first by a port $7_2$ formed in the area $9_2$ of the first disk 9 and the second by an elbowed groove $7_3$ hollowed in the inner surface of the wall 4.

The curvilinear channel $7_1$ which has just been described can be produced extremely simply, requiring no tunneling in a rigid or elastic solid part: this channel is automatically formed by simple mutual juxtaposition of the disk 9, the diaphragm 6, 8 and the base of the wall 4.

It is to be noted in addition that the presence of a rigid metallic member, namely the disk 9, among those which directly define said curvilinear channel 7 confers on the latter the minimum of non-deformability required in the course of time.

In is seen in FIG. 1 that the base of the elastic wall 4 is finally constituted by a relatively thick cylindrical skirt $4_1$ of axis X resting underneath on the disk 9 and inserted radially and contiguously —with the exception of its lower portion partially hollowed by the curvilinear channel $7_1$—between the beading 8 and the ring 11.

The difference between the axial thicknesses of the diaphragm 6 and its beading 8 is largely greater than the amplitude of the movements permitted for this diaphragm, which amplitude must be less than 0.5 mm, as has been stated above.

To obtain such a limitation, one and/or other of the opposite surfaces of the diaphragm 6 and of the disks 9 and 10 are made to include suitable projections.

In the embodiment illustrated in FIG. 1, these projections are constituted by hemispherical bulges 15 produced by molding with the diaphragm 6.

One of these bulges is provided here at the center of each of the two surfaces of the diaphragm and is surrounded by a crown of four other identical bulges.

Figure 3:
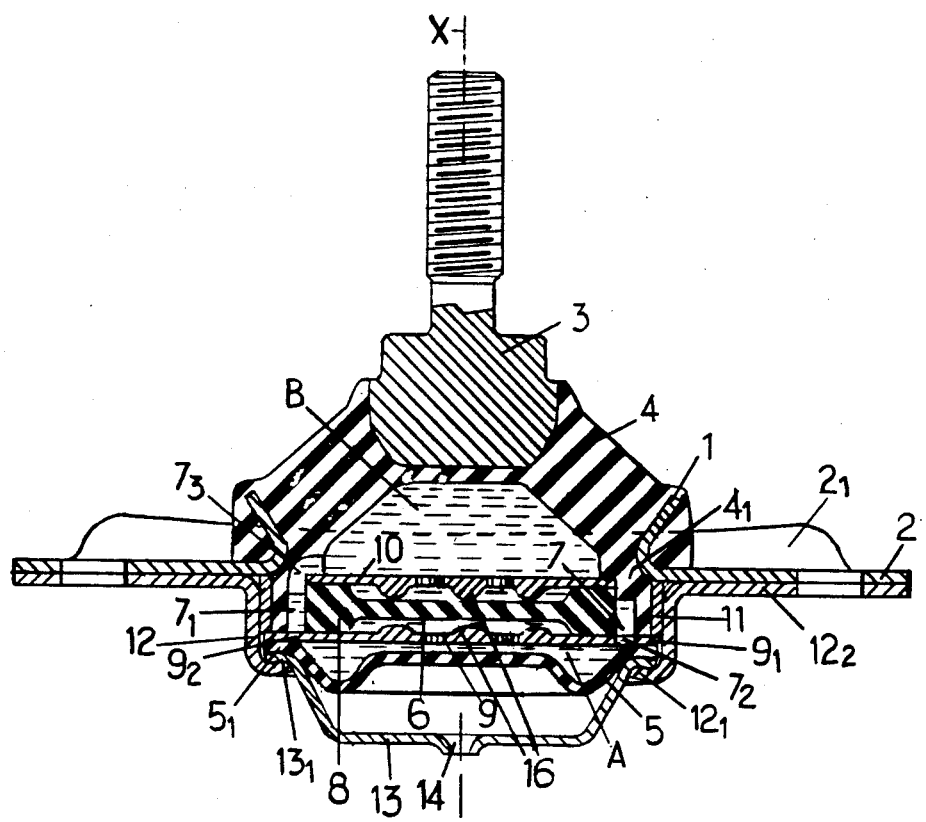
FIG. 3 is an axial section of another embodiment of the invention similar to FIG. 1.

In the embodiment illustrated in FIG. 3, these projections comprise bulges 16 on the faces of disks 9 and 10 opposite diaphragm 6.

However the bulges concerned could, of course, be of different shapes, for example, that of ridges with rounded crests and/or be distributed otherwise, for example, in several concentric rings.

The operation of the hydraulic antivibration support described above is that which has been previously indicated:
- as long as it is a matter of damping vibrations, of the supported member, having relatively high frequency and small amplitude (namely of the order of a tenth of a mm), the corresponding movements of the mass of liquid contained in the support are totally compensated by the deflections of the diaphragm 6 without the throttling of this liquid in the passage 7 being able to play any role,
- on the contrary, when a relative movement between thebearing member and the supported member is relatively slow and exceeds the amplitude corresponding to the maximum travel of the diaphragm 6, the liquid from one of the compartments A and B is driven into the other through the passage 7, which ensures "hydraulic" damping in the conventional sense.

As a result of which, and whatever the embodiment adopted, there is provided finally an antivibration support whose constitution and operation is sufficiently understandable from the foregoing.

This support has numerous advantages with respect to those previously known, in particular the following :
- efficiency and silence of operation, as results from experience,
- robustness and longevity, considering that said support relies only on mechanically strong components little stressed in deformation in the course of their operation,
- simplicity of manufacture and of assembly and hence low cost price.

As is self-evident, and as emerges besides already from the foregoing, the invention is in no way limited to its types of application and embodiments which have been more especially envisaged ; it encompasses, on the contrary, all modifications, particularly the following.

The limitation of the amplitudes of deflection of the diaphragm 6 could be ensured otherwise than by axial abutment of portions of this diaphragm against fixed perforated facing disk portions 9 and 10.

Thus this limitation could be ensured by the incorporation of an inextensible armature in the diaphragm or by a judicious choice of the constituent material of this diaphragm (possibly a plastics material) or again by provision of suitable grooves in the surfaces of said diaphragm, the grooves hollowed in each surface being opened, with for example their parallel surface, for the flat state of the diaphragm and on the contrary closed when said surface reaches its maximum concavity : these grooves can have the general shape of a spiral extending over the whole surface concerned of the diaphragm, or again that of concentric circles.

In such cases, the disks are no longer necessary and it is possible to eliminate from the above described support the second disk 10 and/or the central portion of the first disk 9 ; in each case, the peripheral zone of this first disk 9 is preserved, which is limited then to a washer whose inner portion bears the beading 8 and whose middle and outer portions correspond respectively to the above arcs $9_1$ and $9_2$.

When the second disk 10 is eliminated, the beading 8 is directly in contact axially and radially, with the elastic wall 4 at the level of the portion, of its outer edge, furthest spaced from the first disk or from the washer which has just been defined.

We claim:

1. Antivibration device designed to be interposed for support and shock-absorbing purposes between two rigid elements, constituted by a fluid-tight box interposed between the two rigid elements, said box comprising two rigid parts which can be made fast respectively with the two rigid elements, a first elastic wall connecting one of the rigid parts in fluid-tight manner to a rigid annular armature forming a portion of the second part, a second elastic wall borne in fluid-tight manner by the annular armature, a deformable partition also borne in fluid-tight manner by the annular armature, between the two elastic walls, and dividing the inside of the box into two chambers, these two chambers communicating with each other through a throttled passage, means for limiting to small amplitude of less than 1 mm, the deflections of the deformable partition in the axial direction perpendicular to its middle plane and a liquid mass filling one of the two chambers and at least a portion of the other chamber contiguous with the deformable partition, wherein said deformable partition is constituted by a thin diaphragm of elastic material surrounded by a continuous annular beading produced on molding with it, said beading is applied on the one hand against the facing elastic wall and on the other hand against a metal washer whose outer edge extends radially beyond the beading and is fixed to the rigid annular armature between the two elastic walls, and the throttled passage is essentially constituted by a curvilinear channel bounded internally by the outer surface of the beading, on one of its axial faces by the washer, and externally and on its other axial face by areas of the facing elastic wall.

2. Antivibration device according to claim 1, wherein the washer constitutes a perforated thin disk.

3. Antivibration device according to claim 2, wherein the beading is encaged contiguously between the washer and the peripheral portion of a second perforated thin metal disk of smaller diameter than the first perforated metal disk.

4. Antivibration device according to claim 3, wherein the means for limiting the amplitude of the deflections of the diaphragm comprise projections provided on this diaphragm.

5. Antivibration device according to claim 4, wherein the projections are convex hemispherical bulges formed by molding with the diaphragm.

6. Antivibration device according to claims 1, 2, 3, 4 or 5 wherein the elastic wall which comes into contact with the beading and which defines in part the throttled passage is the first elastic wall.

7. Antivibration device according to claim 3 wherein the means for limiting the amplitude of the deflections of the diaphragm comprise projections provided in the faces of disks opposite said diaphragm.

8. Antivibration device according to claims 1, 2, 3, 4, 5 or 7 wherein the fastening of the outer edge of the washer to the rigid annular armature is ensured by clamping this edge between a metal ring applied axially against this armature and a turned-back annular rim of a metal plate comprised by said armature.

* * * * *